United States Patent [19]
van Woesik et al.

[11] Patent Number: 5,550,944
[45] Date of Patent: Aug. 27, 1996

[54] FIBRE OPTIC CONNECTOR

[75] Inventors: Theodorus C. M. van Woesik; Lucas G. C. Teurlings, both of Hertogenbosch; Willem S. J. Vermeulen, Boekel, all of Netherlands

[73] Assignee: The Whitaker Corporation, Wilmington, Del.

[21] Appl. No.: 432,299

[22] Filed: May 1, 1995

[30]     Foreign Application Priority Data

May 4, 1994 [GB] United Kingdom ............. 9408877

[51] Int. Cl.⁶ ..................................... G02B 6/38
[52] U.S. Cl. ........................................... 385/73
[58] Field of Search ...................... 385/72, 73, 70, 385/71, 74, 80, 85, 147

[56]                References Cited

U.S. PATENT DOCUMENTS

| | | | |
|---|---|---|---|
| 4,461,539 | 7/1984 | Bailey et al. | 385/73 |
| 4,681,398 | 7/1987 | Bailey et al. | 385/80 |
| 4,743,084 | 5/1988 | Manning | 385/85 X |
| 5,337,385 | 8/1994 | Baderschneider et al. | 385/59 |

*Primary Examiner*—Akm E. Ullah
*Attorney, Agent, or Firm*—Eric J. Groen

[57]                 ABSTRACT

A fibre optic coupling assembly includes a coupling assembly comprised of a spring loaded coupling lock which locks to fibre connectors together by way of spring balls located in locking grooves. The forward movement of the coupling locks, against the spring pressure of the spring, allows the disengagement of the two fibre connectors. The fibre connector has a connector housing with a crimp sleeve and an outer coupling nut. The coupling nut is threadably received over the rear end of the connector housing. The combination of the coupling nut and the crimp sleeve provides for strain relief of the fibre cable as well as pushes the fibre forward due to the radial contraction of the crimp sleeve, thereby gripping the outer insulation of the cable, and forcing the entire cable further forward upon further rotation of the coupling nut. The inner fibre is pushed against the inside surface of a glass plate ensuring a good optical connection, whereas the glass plate prevents the free end of the plastic fibre from damage.

11 Claims, 10 Drawing Sheets

FIBRE OPTIC CONNECTOR

BACKGROUND OF THE INVENTION

1. Field of the Invention

The subject of the invention relates to improvements to fibre optic connectors which are meant for end-to-end abutting connection.

2. Description of the Prior Art

It is known from European patent 0347118 to provide a fibre connector for end-to-end abutment with another like fibre connector, where a fibre cable can be positioned in the connector for termination thereof. While the design of the above mentioned subject European patent is an excellent termination for field installable fibre connectors, some of the drawbacks of the above mentioned connector are addressed by this application.

First, as the anticipated pig-tail fibre at the front of the fibre connector is plastic, and the front end face of the plastic fibre is ground smooth, the plastic fibre can be scratched if not handled appropriately. Secondly, while the fibre of the above mentioned European patent is held in place by a clip grippingly engaging the outer insulation of the fibre cable, it is sometimes necessary to have a positive force of the fibre into the index-matching gel. Finally, it is necessary to provide some means of aligning the two fibre connectors of the above mentioned European patent as well as to lock them together, which is also addressed by the present invention.

SUMMARY OF THE INVENTION

A fibre optic connector for terminating a plastic fibre optic cable having an end, the connector comprising a connector housing having a bore extending therethrough to a front face, the fibre optic cable being receivable within the bore; the connector characterized in that a transmissive end plate is disposed across the bore towards the face and, when the cable is received within the bore the end is held in close proximity to the end plate.

It is therefore an object of the invention to provide an improved fibre optic connector, whereby the end face of the fibre connector cannot be scratched or otherwise damaged.

It is a further object of the invention to provide a means for positively forcing the fibre cable to be terminated forward into the index-matching gel.

It is a further object of the invention to provide a locking means for releasably interconnecting two fibre optic connectors.

DETAILED DESCRIPTION OF THE PREFERRED EMBODIMENT

Figure 1:
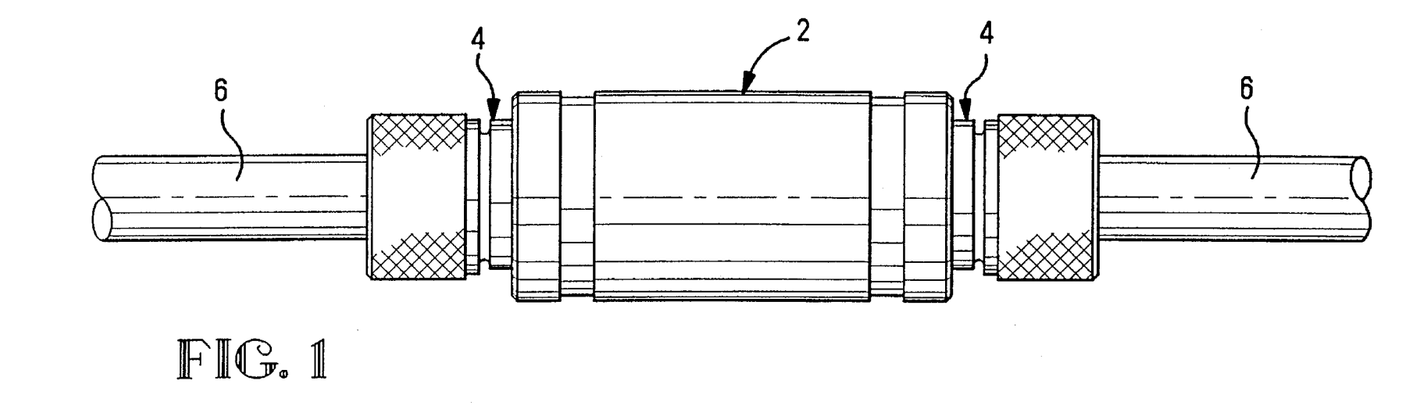
FIG. 1 is a side plan view of two fibre optic connectors interconnected to an intermediate coupling connector.
Figure 2:
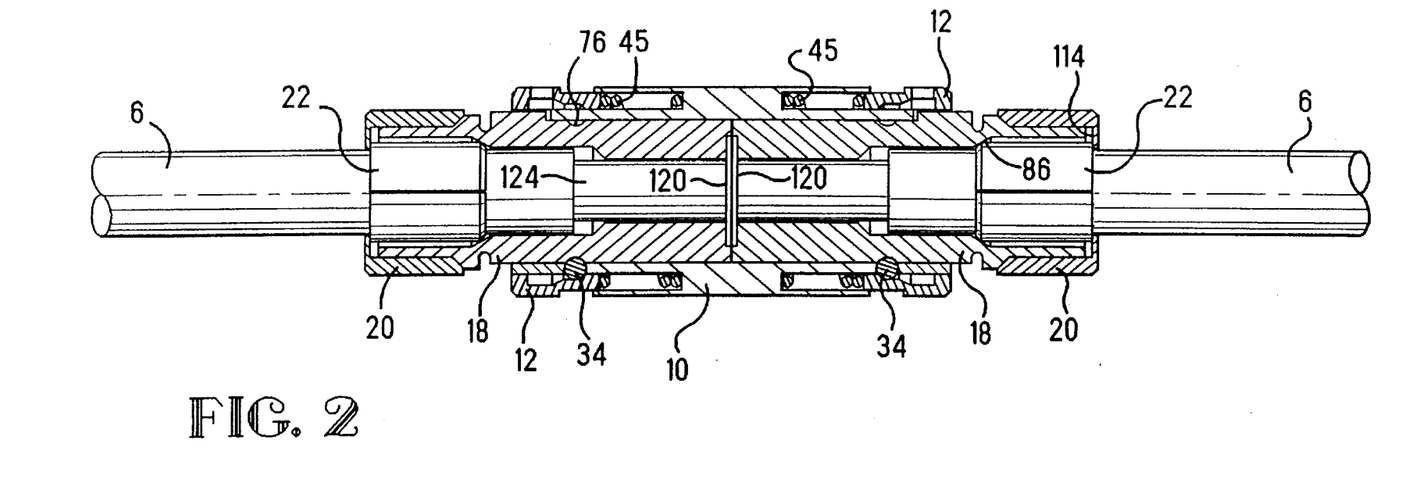
FIG. 2 is a longitudinal centre line section of the connection shown in FIG. 1.

With reference first to FIGS. 1 and 2, the fibre optic termination is comprised of a central coupling assembly shown generally at 2, which can receive from opposite ends thereof identical fibre optic connectors, shown generally at 4. Each of the fibre optic connectors 4 have a flexible light pipe, or fibre optic cable 6 interconnected thereto, for abutting relation within the coupling assembly.

It should be appreciated, especially from FIG. 2, that the coupling assembly 2 is comprised of a coupling housing in the form of a circular shell which includes a spring loaded release member 12 at both ends which receives and locks the two fibre connectors in place. Similarly, the two fibre connectors 4 include connector housings 18 having a coupling nut 20 and a crimp bushing 22 at each end thereof.

Figure 3:
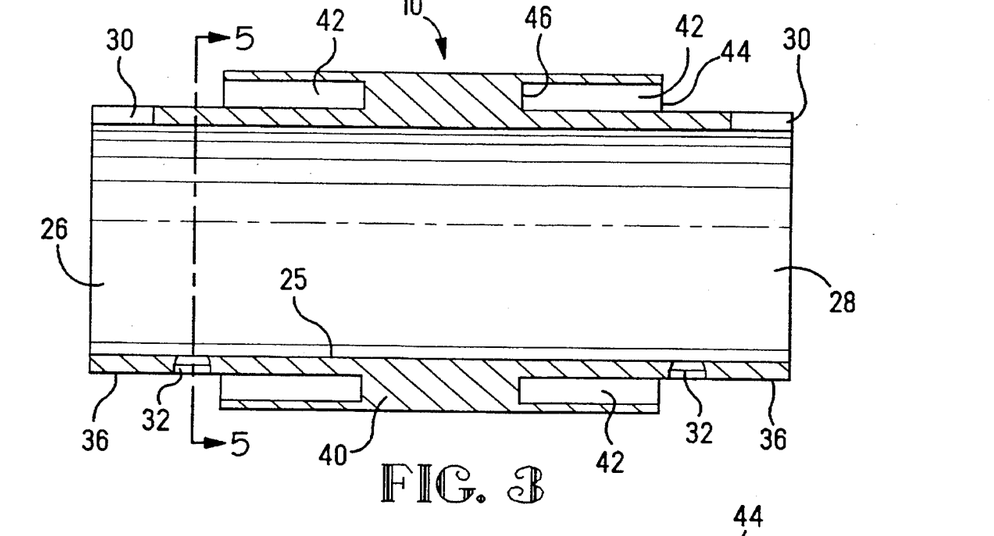
FIG. 3 is a longitudinal cross-sectional view through the connector shell shown in FIGS. 1 and 2.
Figures 4, 5:
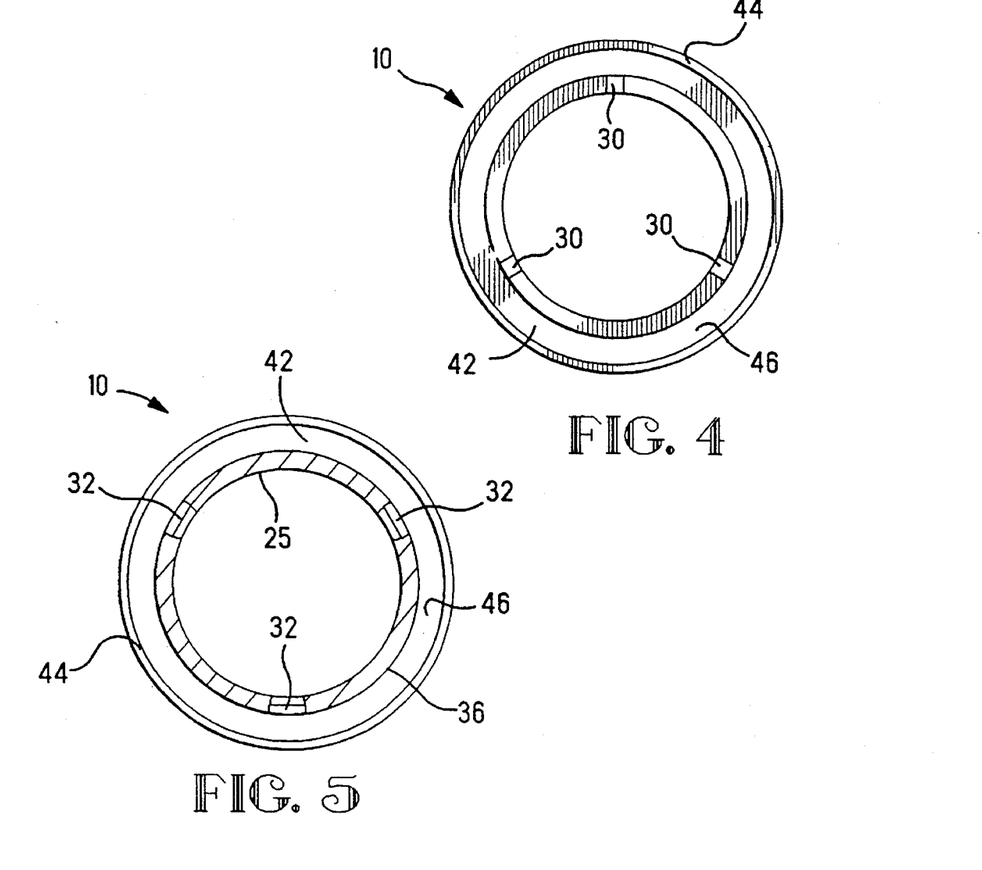
FIG. 4 is an end view of the coupling connector shown in FIG. 3.
FIG. 5 is a cross-sectional view through lines 5—5 of FIG. 3.

With reference now to FIGS. 3–5, the coupling housing 10 will be described in greater detail. The coupling housing 10 is provided with an inner diameter at 25 profiled for receiving the two fibre connectors, through opposite ends 26, 28. Each end 26, 28 includes an alignment slot 30 for aligning the fibre connectors to the coupling assembly. The coupling housing 10 further includes undercut apertures 32, and as shown in FIG. 5, three are included at each end in radially equidistant disposition. It should be appreciated that these apertures 32 are to receive locking balls 34 (FIG. 2) as will be described in greater detail, but it should be understood at this point that the apertures 32 are undercut such that the ball is received from the outer surface 36 but that the ball 34 cannot pass completely through the aperture due to the undercut. Finally the coupling housing 10 includes an increased diameter portion at 40 having internal grooves 42 at each end, which are profiled to receive the compression springs 45 (FIG. 2), as will be described in further detail herein. As best shown in FIG. 3, the grooves 42 define an outer edge at 44 and an inner outwardly facing surface 46 in each groove 42.

Figure 6:
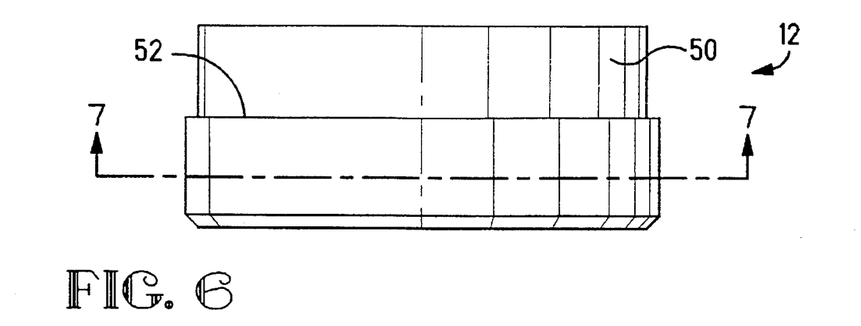
FIG. 6 is a side view of the locking coupling which is incorporated into the coupling housing shown in FIGS. 1 and 2.
Figure 7:
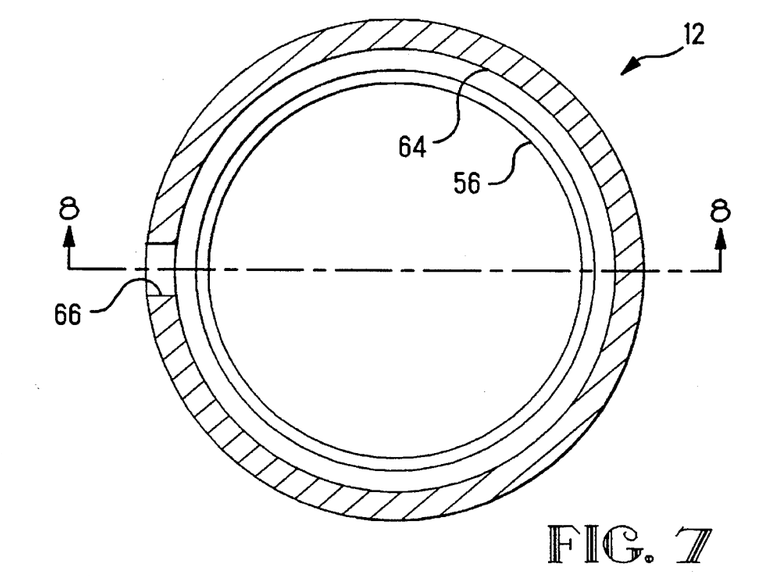
FIG. 7 is a cross-sectional view through lines 7—7 of FIG. 6.
Figure 8:
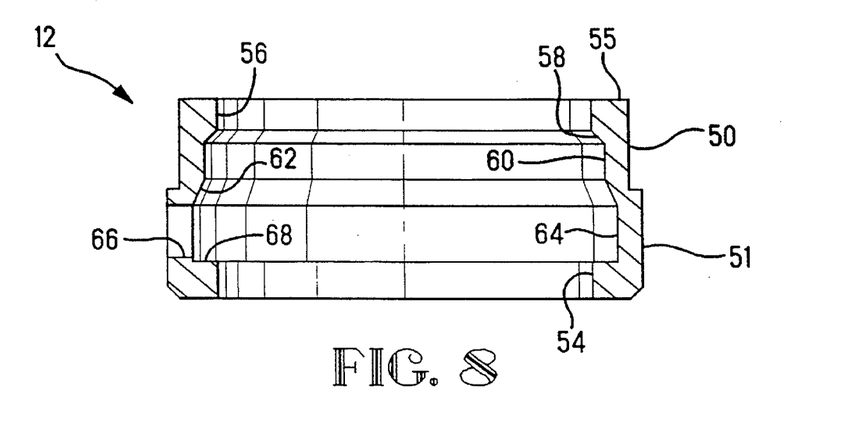
FIG. 8 is a cross-sectional view through lines 8—8 of FIG. 7.

With respect now to FIGS. 6–8, the coupling member 12 will be described in detail, but the specific geometrical relationship, as it corresponds to it's cooperation with the coupling housing will be described in greater detail with reference to the assembly of the coupling member. With specific reference to FIG. 8, the coupling member 12 includes an outer diameter portion 50, an enlarged diameter portion 51, thereby defining a forwardly facing edge 5 (FIG. 6). The coupling member 12 further includes inner diameters 54 and 56, which have a common diameter. The coupling member 12 further includes a front face 55, a chamfered surface 58, an inner diameter 60, a camming surface 62, and an inner diameter 64. An access aperture 66 is located within the inner diameter 64, and a forwardly facing surface 68 is positioned directly behind the aperture 66.

Figure 9:
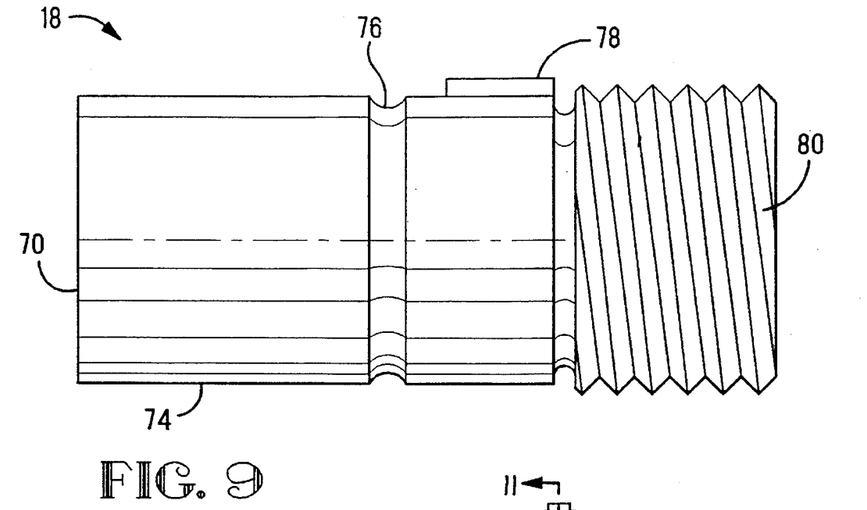
FIG. 9 is a side plan view of the connector housing of one of the fibre connectors shown in FIGS. 1 and 2.
Figure 10:
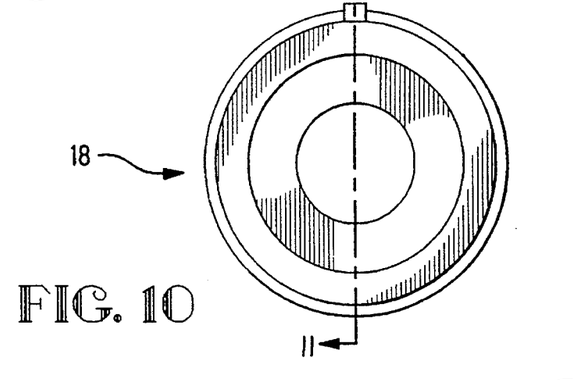
FIG. 10 is an end view of the connector housing shown in FIG. 9.
Figure 11:
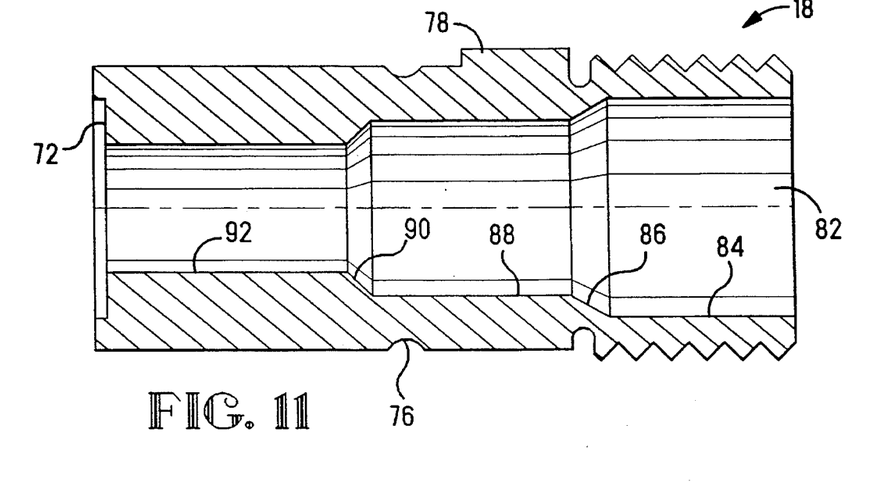
FIG. 11 is a longitudinal cross-section through lines 11—11 of FIG. 10.

With respect now to FIGS. 9–11, the connector housing 18 will be described in greater detail. As shown in FIG. 9, the fibre connector housing 18 includes a front end face 70, having a recessed section 72 (FIG. 11), the recess section 72 being profiled to receive a coupling plate as will be described further herein. The housing 18 further includes an outer diameter at 74 having a locking groove at 76 and an alignment rib at 78. The rear section at 80 is threaded to receive the coupling nut as will be described herein. With respect now to FIG. 11, a fibre receiving bore is shown generally at 82 and includes an enlarged diameter section 84, a lead-in section 86, a first reduced diameter bore 88, a second lead-in section 90 and a second reduced diameter 92.

Figure 12:
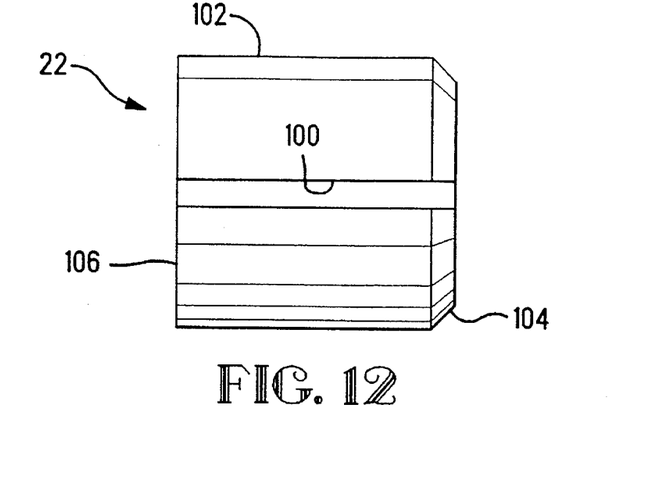
FIG. 12 is a side plan view of the crimp bushing which is incorporated in the fibre connector.
Figure 13:
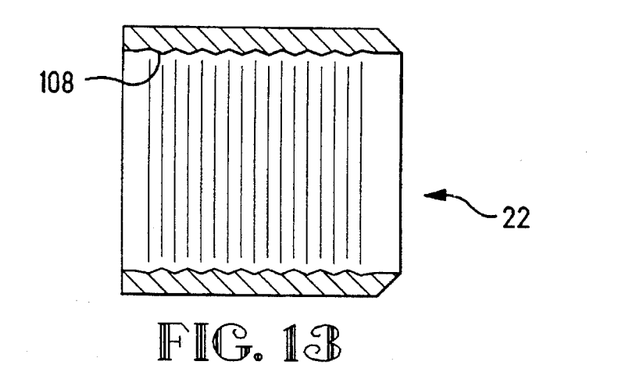
FIG. 13 is a longitudinal cross-section of the crimp bushing shown in FIG. 12.

With respect now to FIGS. 12 and 13, the crimp bushing 22 is shown as a cylindrical split ring having a seam at 100 with an outer diameter 102, a front tapered section 104 and an end edge 106. As shown in FIG. 13, the inner diameter is serrated at 108 for gripping engagement with the cable to be terminated.

Figure 14:
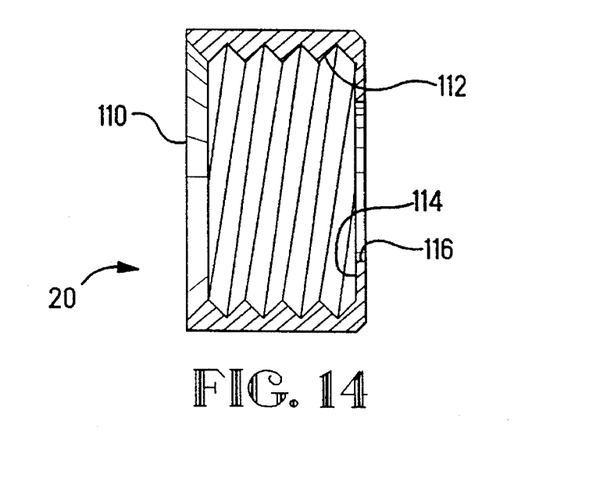
FIG. 14 is a cross-sectional view of the coupling nut.

With respect now to FIG. 14, the coupling nut 20 is shown having an open end 110 having an internally threaded section at 112, a forwardly facing surface at 114 and a cable receiving opening at 116. With the components as described above, the assembly and usage thereof will now be described in further detail.

Figure 15:
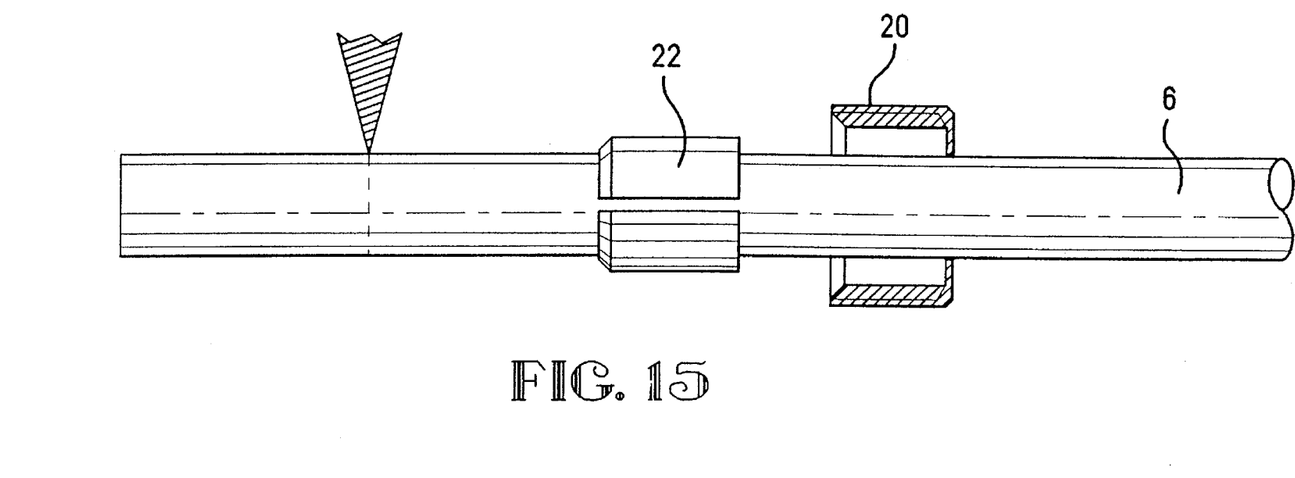
FIGS. 15–18 show sequential views of the termination procedure of a fibre cable into the fibre connector.
Figure 16:
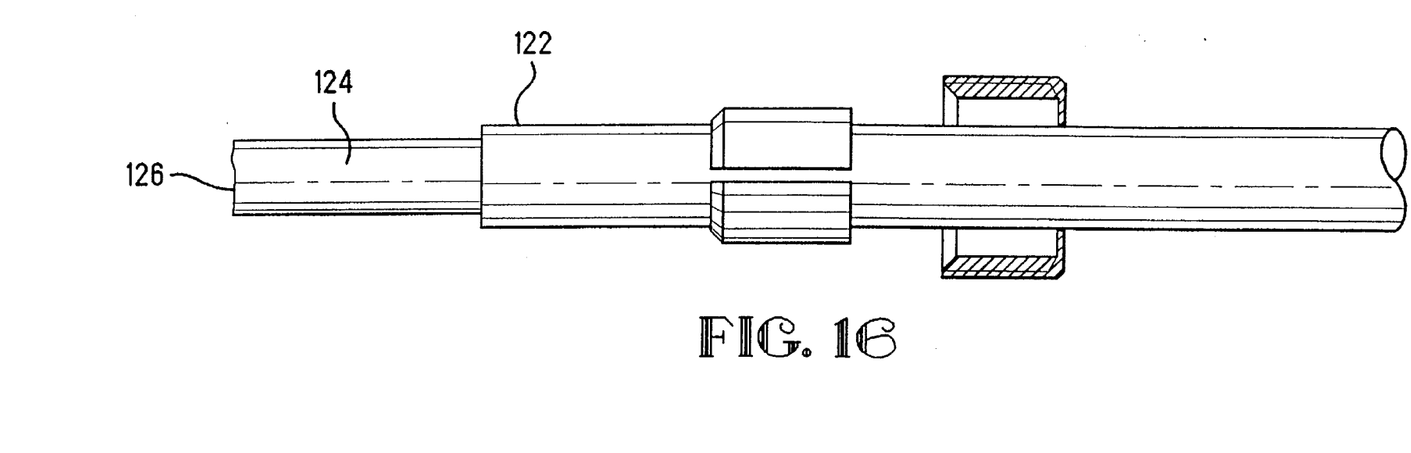

With reference now to FIGS. 15–18, the termination procedure of the fibre to the fibre connector will now be described in greater detail. With reference first to FIG. 15, a fibre light pipe or cable 6 has the coupling nut and crimped sleeve 22 positioned thereover, whereupon the end of the fibre 6 can be cut by such means as a cutting knife. The insulation 122 is then stripped from the end of the cable 6 to expose the inner fibre 124 and the end face 126. It is not anticipated that the end face 126 needs to be ground or otherwise polished, although this could be done as well.

Figure 17:
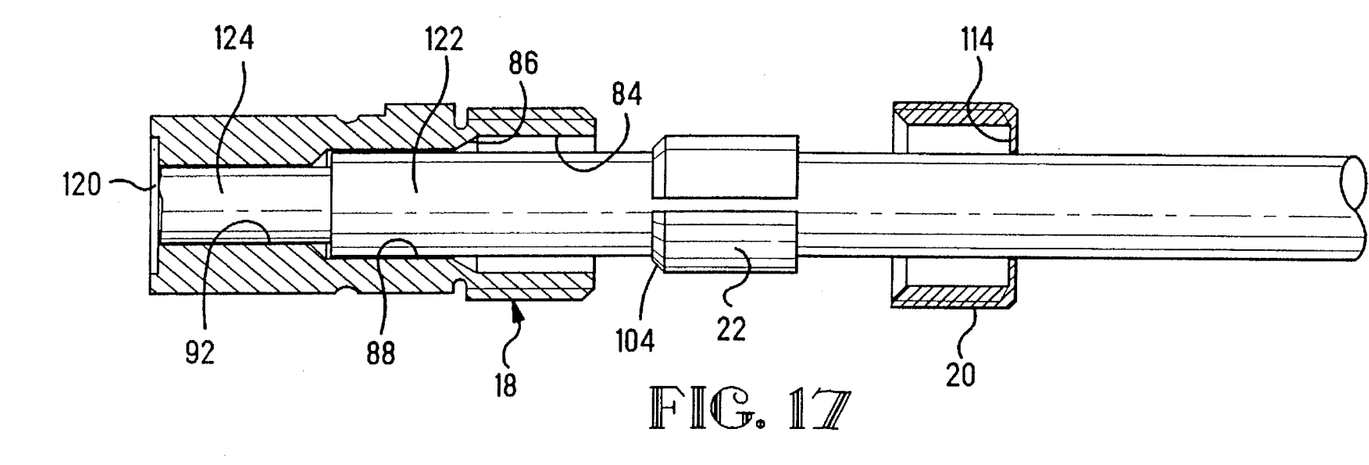
Figure 18:
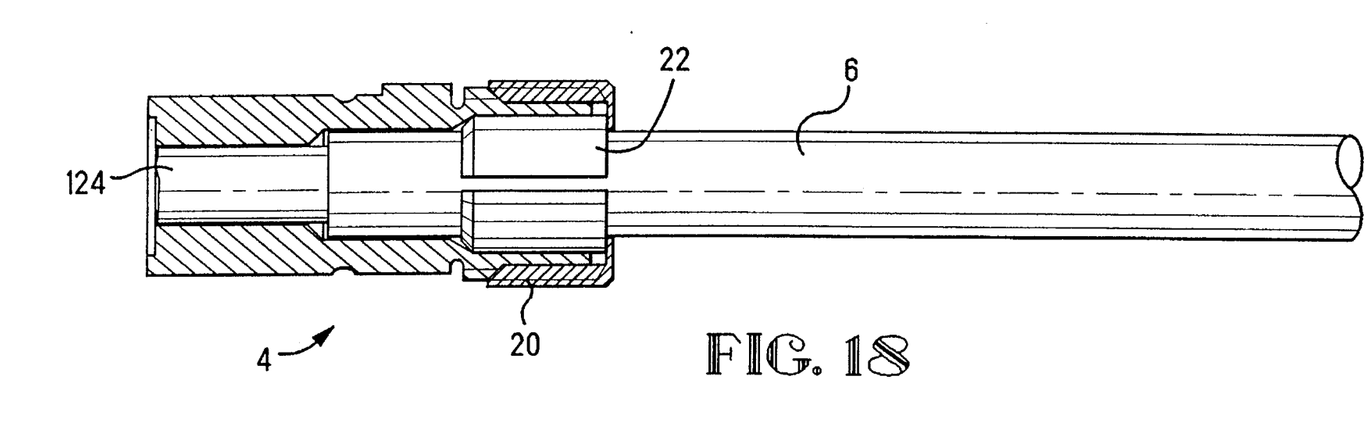

With reference to FIG. 17, it should be appreciated that the end plate 120 has now been fixed within the aperture 72 (FIG. 11) of the housing 18. It is anticipated that the plate 120 be comprised of glass, although it could be also made of quartz or any other durable and light transmissive material. As shown in FIG. 17, it is also anticipated that index-matching gel is inserted between the end face 126 of the fibre and the inside surface of the plate 120 to improve the optical termination of the fibre 124 against the plate 120. As shown in FIG. 17, the bared fibre portion 124 is inserted within the diameter portion 92 of the housing, whereas the insulation 122 is positioned within the diameter portion 88 of the housing 18. It should be appreciated that the area intermediate the inner diameter 84 and the outside diameter of the insulation 122 allows for the entry of the crimp sleeve 22 therein. The crimp sleeve 22 can be slid forwardly to a position where the chamfered edge 104 is adjacent to the camming surface 86, whereupon the coupling nut 20 can be threadably received onto the end of the fibre connector over the threaded end 80. It should be appreciated that further threadable receipt of the coupling nut 20 on the fibre housing 18 causes the face 114 to engage the rear edge 106 of the crimp sleeve, pushing it further forward.

The engagement of the surfaces 86, 104 causes the radial contraction of the crimp sleeve 22 against the outer insulation 122 of the fibre cable 6. The radial contraction can continue to the point where the seam 100 on the crimp sleeve 22 is closed. The radial contraction of the crimp sleeve has two important features for the fibre termination. First, the radial contraction of the crimp sleeve 22 causes a strain relief effect on the fibre cable to prevent pulling strains on the cable from affecting the termination. Secondly, as the crimp sleeve 22 radially contracts and as the coupling nut 20 is further threaded forward, the combination of the coupling nut 20 and crimp sleeve 22 causes forward movement of the fibre cable to ensure a good optical connection between the end face 126 and the plate 120. It may be that fibre-matching gel is inserted in the connector, however, for some applications the connection may be adequate without it, as the plastic fibre is somewhat deformed upon engagement against the glass plate 120.

Figures 19, 20:
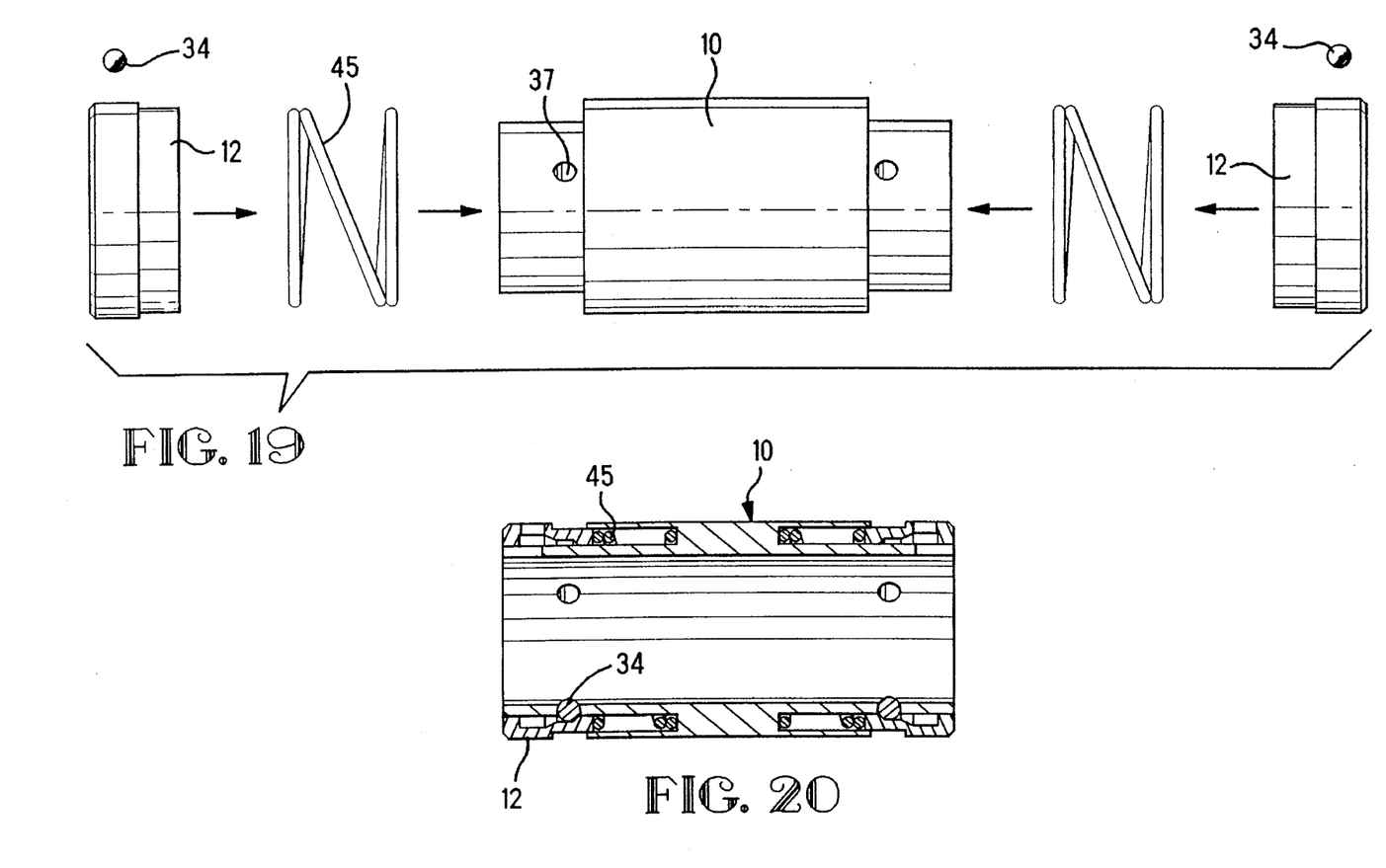
FIG. 19 shows a sequential assembly view of the shell connector assembly.
FIG. 20 is a longitudinal cross-sectional view of the assembled coupling assembly.

With reference now to FIGS. 19 and 20, the assembly of the coupling device will now be described in greater detail. The compression springs 45 are first installed into the coupling housing 10 from opposite ends thereof into the groove 42 (FIG. 3). At this point the coupling lock 12 can be inserted over one end such that diameters 54, 56 (FIG. 8) are slidably received over outer diameter 36 (FIG. 3). The locking ball 34 can thereafter be received through aperture 66 and the coupling lock 12 can be rotatably and axially moved to the position where the aperture 66 overlies the first aperture 32 whereupon the locking ball 34 drops into an aperture 32. The coupling lock can thereafter be rotated to the next position, that is where the next aperture 32 is aligned with the aperture 66 and the second locking ball is inserted therein. This procedure is continued until all the apertures 32 on both ends of the coupling housing 10 are filled, whereupon the aperture 66 is closed by means of a plug, such as a set screw or other plug apparatus.

Figure 21:
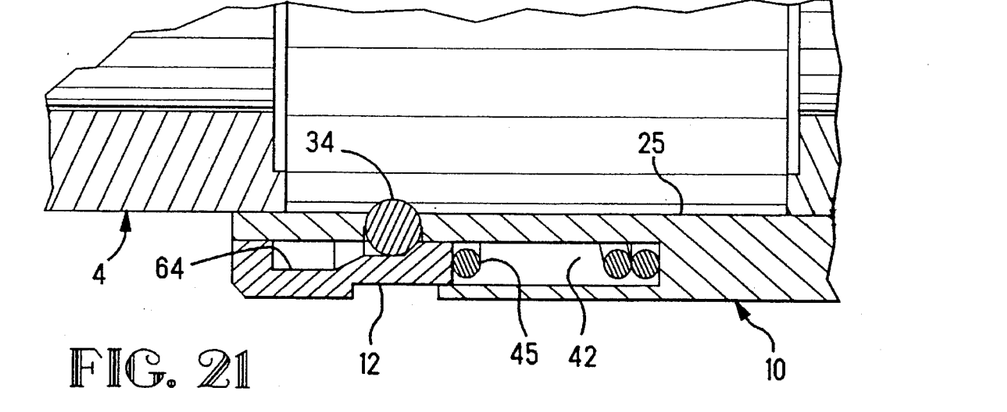
FIGS. 21–23 show sequential views of the locking and unlocking of a fibre connector into the coupling assembly.
Figure 22:
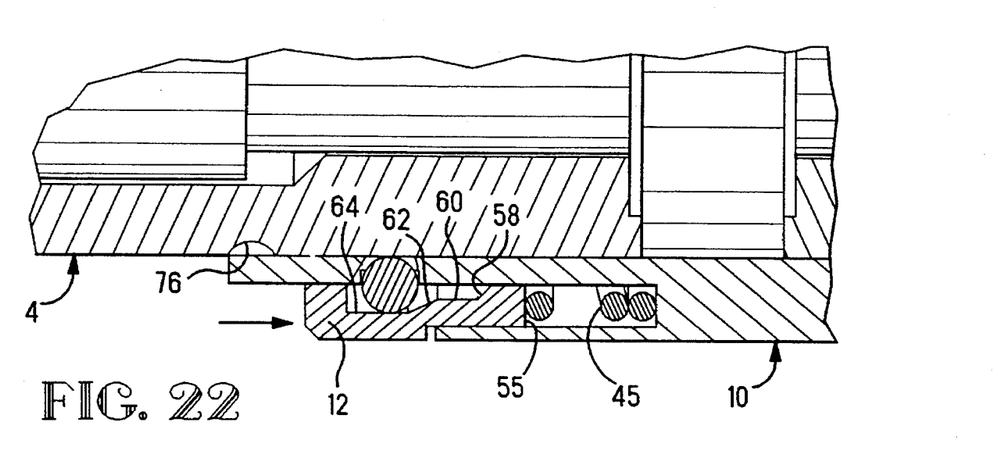
Figure 23:
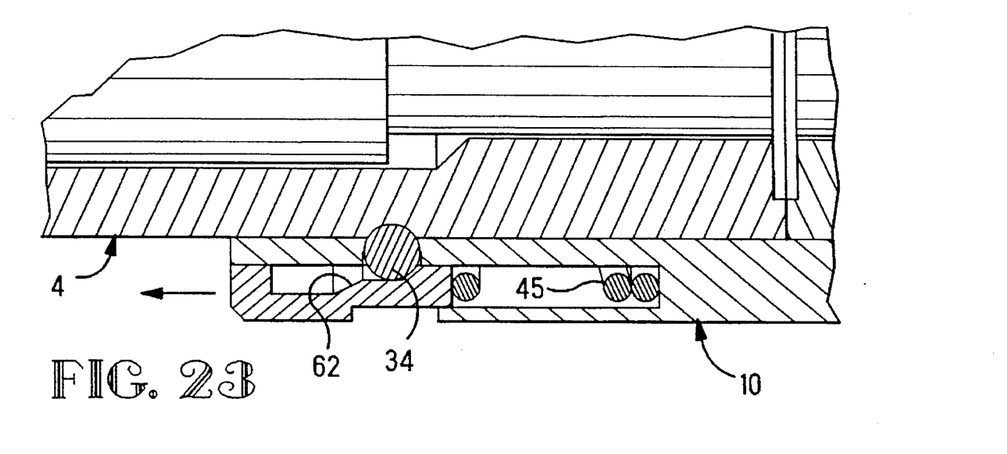

With respect now to FIGS. 21–23, the locking procedure will be described in greater detail. With reference first to FIG. 21, the neutral position is shown, that is where no fibre connector is fully inserted, and in this position, the locking ball 34 is positioned within the aperture 32 and projects beyond the inner diameter 25 of the coupling housing 10. The coupling ball 34 is held in this position by it's engagement against the inner diameter 60 and surface 58. The locking balls 34 will remain in this neutral position due to the compression spring 45 pushing against the front edge 55 of the coupling lock 12. As shown in FIG. 22, a fibre connector 4 can be inserted by first pushing the coupling lock 12 forward causing compression of the spring 45 to a position where the locking ball 34 rests against diameter 64 rather than diameter 60. It should be appreciated that the geometrical relationship between the locking ball 34 and the diameter 64 is such that one of the positions shown in FIG. 22, the locking balls retract to a position where they are no longer in interference for the entry of the fibre connector 4 as shown. The fibre connector 4 can be inserted to the position where the locking groove 76 is in alignment with the locking balls 34, and when in this position, the compression spring 45 will force the coupling lock rearwardly causing the camming surface 62 to force the ball once again into the aperture 32 and against the surfaces 58, 60. It should be appreciated that due to this design, that the fibre connectors 4 cannot be disengaged without the manual actuation of the coupling lock 12.

Figure 24:
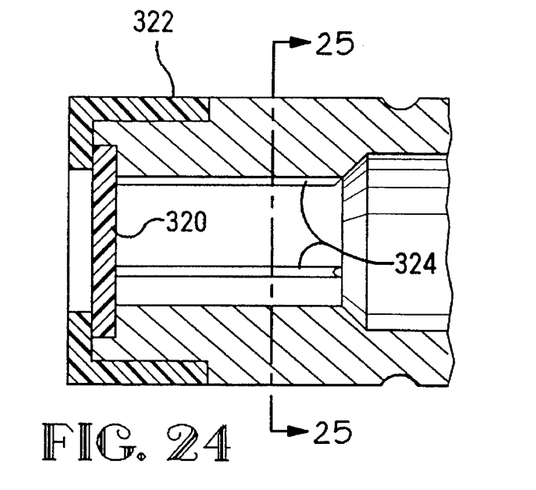
FIGS. 24–27 show alternative embodiments of the protective end plate.
Figure 25:
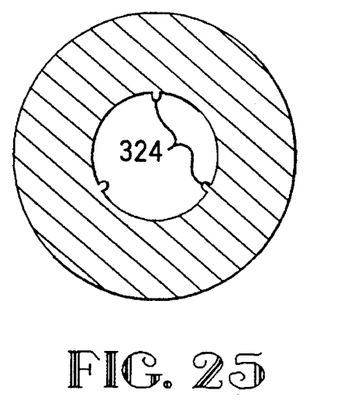
Figure 26:
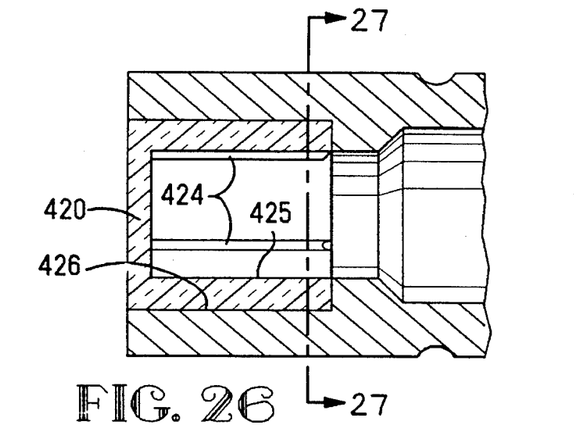
Figure 27:
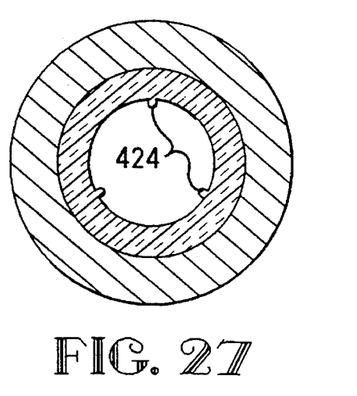
Figures 28, 29:
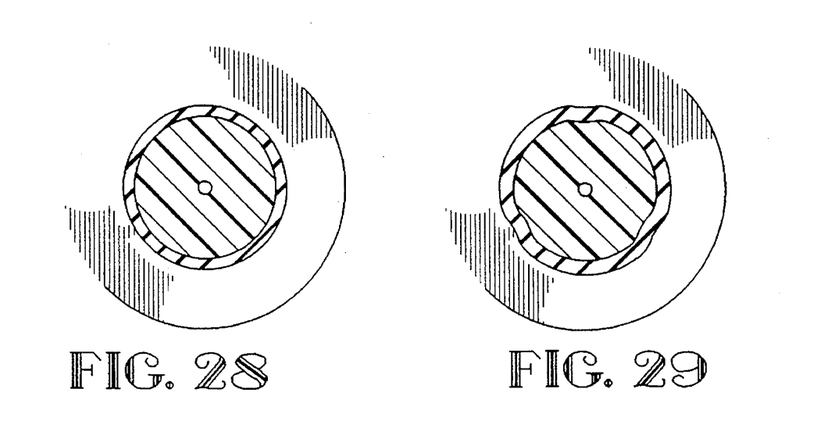
FIGS. 28 and 29 show the centering of a fibre cable in any of the embodiments shown.

FIGS. 24 and 25 show an alternative embodiment of the above mentioned connector where a protective plate 320 is held in place by press-fit holding member 322. FIGS. 24 and 25 also show three radially disposed ribs 324 for aligning the fibre cable upon insertion therein. FIGS. 26 and 27 show a further embodiment of connector including an end plate 420 where the member includes not only a plate section but also a cylindrical portion at 425 which can either be press-fit within an inner diameter 426 or can be adhesively fixed therein. In this embodiment the entire member 420 would be moulded from a transparent material, such as glass or quartz, and would further include ribs 424 as shown best in FIG. 27. In either case, the centering of the fibre cable would be shown in FIGS. 28 and 29 where the diameter between the surfaces of the ribs is the exact diameter of the fibre cable, whereas in FIG. 29, some compression of the fibre cable is necessary and is accomplished by somewhat compressing the fibre core of the fibre cable.

Advantageously, the above described invention accomplishes the objects as follows. The plate 120, 320 or 420 at the front end of the fibre connector 4 prevents the scratching or damage to the end face 126 of the plastic fibre 6. Furthermore, the combination of the coupling nut and the crimp sleeve force the end face 126 of the fibre against the inside surface of the plate 120, 320 or 420 for an improved fibre connection. Finally a locking mechanism is described which provides for adequate locking of the two fibre connectors 4 together.

We claim:

1. A fibre optic connector assembly comprising a fibre optic connector for terminating a plastic optical cable having an end, the connector including a connector housing having a bore extending therethrough to a front face of the housing for receiving the fibre, where a transmissive end plate is positioned across the bore in proximity of the front face, the connector further including a crimp sleeve to engage the cable in a fixed manner with the end in close relation with the end plate and the housing having an engagement feature on an outer surface thereof; and a coupling sleeve having a first end for receiving the connector where the first end includes an inner surface and an outer surface with an opening therebetween, a lock extending across the opening and a locking sleeve disposed upon the housing and operatively connected to the lock, the locking sleeve having a first position where the lock is displaceable clear of the engagement feature for insertion and removal of the connector and a second position where the lock interfered with the engagement feature to retain the connector therein.

2. The fibre optic connector assembly of claim 1, wherein the locking sleeve has first and second inner surfaces overlying the lock at the respective first and second positions where the first surface is located above the outer surface an amount that enables clearance between the lock and engagement feature while retaining the lock within the opening and the second inner surface backs up the lock when in the second position.

3. The fibre optic connector assembly of claim 1, wherein the coupling sleeve further includes a biasing member naturally displacing the locking sleeve into the second position.

4. The fibre optic connector assembly of claim 2, wherein the lock is a spherical ball.

5. The fibre optic connector assembly of claim 4, wherein the locking sleeve includes an inner surface closely approximating the outer surface of the coupling sleeve on both sides of the first and second surfaces.

6. The fibre optic connector assembly of claim 1, wherein the connector and the coupling sleeve are matable in a keyed manner.

7. The fibre optic connector assembly of claim 2, wherein the coupling sleeve includes a second end similarly configured to the first end for receiving a second fibre connector therein in an optically coupled manner to the first connector.

8. A fibre optic connector assembly for terminating an end of an optical fibre; where the fibre optic connector assembly comprises: a fibre optic connector including a connector housing having a front face, a bore extending through the housing that is open at the front face for receiving the optical fibre, a transmissive end plate positioned across the bore proximate the end face, a cable engaging structure along the bore to engage the cable in a fixed manner, and an engagement feature disposed on an outer surface of the housing; whereby the end of the fibre is fixed in close relation to the transmissive end plate by the cable engaging structure; and, a coupling sleeve having a first end for receiving the connector where the first end has an inner surface and an outer surface with an opening therebetween, a lock that extends across the opening, and a locking sleeve disposed upon the housing and operatively coupled to the lock, where the locking sleeve has a first position where the lock permits insertion and withdrawal of the connector and a second position where the lock interferes with the engagement feature of the connector to retain the connector therein.

9. The fibre optic connector assembly of claim 8, wherein the cable engaging structure includes a crimp sleeve disposed about the fibre and a coupling nut fixable to the housing with the crimp sleeve therebetween; whereby tightening of the coupling nut causes the crimp sleeve to grip the fibre.

10. The fibre optic connector assembly of claim 8, wherein the locking sleeve is normally biased into the second position by a resilient member acting between the coupling sleeve and the locking sleeve, whereby the locking sleeve must first be displaced to the second position before receiving the fibre optic connector.

11. The fibre optic connector assembly of claim 10, wherein the locking sleeve is slidably disposed upon the outer surface of the coupling sleeve and the coupling sleeve further includes a further outer edge that defines a groove between the outer surface and the outer edge, said resilient member being positioned within the groove, where the locking sleeve closes the groove.

\* \* \* \* \*